US009672575B2

(12) United States Patent
Chandran et al.

(10) Patent No.: US 9,672,575 B2
(45) Date of Patent: Jun. 6, 2017

(54) CAPTURING INFORMATION REGARDING AN INTERACTION TO A DATABASE

(71) Applicant: salesforce.com, inc., San Francisco, CA (US)

(72) Inventors: Venk Chandran, Toronto (CA); Irwin Liu, Toronto (CA); Ashwin Kashyap, San Jose, CA (US); Jung Yeon Yoon, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 379 days.

(21) Appl. No.: 14/243,624

(22) Filed: Apr. 2, 2014

(65) Prior Publication Data

US 2014/0304596 A1 Oct. 9, 2014

Related U.S. Application Data

(60) Provisional application No. 61/807,880, filed on Apr. 3, 2013.

(51) Int. Cl.
*G06F 3/048* (2013.01)
*G06Q 50/00* (2012.01)

(52) U.S. Cl.
CPC .................................... *G06Q 50/01* (2013.01)

(58) Field of Classification Search
USPC .......................................................... 715/704
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Matthew Ell
(74) *Attorney, Agent, or Firm* — Weaver Austin Villeneuve & Sampson LLP

(57) ABSTRACT

Disclosed are methods, apparatus, systems, and computer readable storage media for capturing information regarding an interaction to a database. A client device receives an indication of an interaction with the client device that satisfies a user-defined trigger. A user interface is provided to the client device having input controls capable of receiving one or more information items. The one or more information items include values for a first data field regarding a user-selected expression and a second data field regarding at least one entity associated with the interaction. The one or more information items may generate a custom object that is stored in a database of the on-demand database service. A profile object for the at least one entity may be generated based on an aggregation of the stored one or more items with attributes of the at least one entity.

19 Claims, 10 Drawing Sheets

(56) References Cited

U.S. PATENT DOCUMENTS 5,963,953 A 10/1999 Cram et al.
5,983,227 A 11/1999 Nazem et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,133 B1 4/2001 Masthoff
6,216,135 B1 4/2001 Brodersen et al.
6,233,617 B1 5/2001 Rothwein et al.
6,236,978 B1 5/2001 Tuzhilin
6,266,669 B1 7/2001 Brodersen et al.
6,288,717 B1 9/2001 Dunkle
6,295,530 B1 9/2001 Ritchie et al.
6,324,568 B1 11/2001 Diec et al.
6,324,693 B1 11/2001 Brodersen et al.
6,336,137 B1 1/2002 Lee et al.
D454,139 S 3/2002 Feldcamp et al.
6,367,077 B1 4/2002 Brodersen et al.
6,393,605 B1 5/2002 Loomans
6,405,220 B1 6/2002 Brodersen et al.
6,411,949 B1 6/2002 Schaffer
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec et al.
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans et al.
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,772,229 B1 8/2004 Achacoso et al.
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker
6,829,655 B1 12/2004 Huang et al.
6,842,748 B1 1/2005 Warner et al.
6,850,895 B2 2/2005 Brodersen et al.
6,850,949 B2 2/2005 Warner et al.
6,907,566 B1 6/2005 McElfresh et al.
7,062,502 B1 6/2006 Kesler
7,069,231 B1 6/2006 Cinarkaya et al.
7,069,497 B1 6/2006 Desai
7,100,111 B2 8/2006 McElfresh et al.
7,181,758 B1 2/2007 Chan
7,269,590 B2 9/2007 Hull et al.
7,289,976 B2 10/2007 Kihneman et al.
7,340,411 B2 3/2008 Cook
7,356,482 B2 4/2008 Frankland et al.
7,373,599 B2 5/2008 McElfresh et al.
7,401,094 B1 7/2008 Kesler
7,406,501 B2 7/2008 Szeto et al.
7,412,455 B2 8/2008 Dillon
7,454,509 B2 11/2008 Boulter et al.
7,508,789 B2 3/2009 Chan
7,599,935 B2 10/2009 La Rotonda et al.
7,603,331 B2 10/2009 Tuzhilin et al.
7,603,483 B2 10/2009 Psounis et al.
7,620,655 B2 11/2009 Larsson et al.
7,644,122 B2 1/2010 Weyer et al.
7,668,861 B2 2/2010 Steven
7,698,160 B2 4/2010 Beaven et al.
7,730,478 B2 6/2010 Weissman
7,747,648 B1 6/2010 Kraft et al.
7,779,039 B2 8/2010 Weissman et al.
7,779,475 B2 8/2010 Jakobson et al.
7,827,208 B2 11/2010 Bosworth et al.
7,853,881 B1 12/2010 Assal et al.
7,886,024 B2 * 2/2011 Kelly .................... G06Q 30/00 707/748
7,945,653 B2 * 5/2011 Zuckerberg ............ G06Q 30/02 709/206
8,005,896 B2 8/2011 Cheah
8,014,943 B2 9/2011 Jakobson
8,015,495 B2 9/2011 Achacoso et al.
8,032,297 B2 10/2011 Jakobson
8,073,850 B1 12/2011 Hubbard et al.
8,082,301 B2 12/2011 Ahlgren et al.
8,095,413 B1 1/2012 Beaven
8,095,531 B2 1/2012 Weissman et al.
8,095,594 B2 1/2012 Beaven et al.
8,103,611 B2 1/2012 Tuzhilin et al.
8,150,913 B2 4/2012 Cheah
8,209,308 B2 6/2012 Rueben et al.
8,209,333 B2 6/2012 Hubbard et al.
8,275,836 B2 9/2012 Beaven et al.
8,457,545 B2 6/2013 Chan
8,484,111 B2 7/2013 Frankland et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,566,301 B2 10/2013 Rueben et al.
8,646,103 B2 2/2014 Jakobson et al.
2001/0044791 A1 11/2001 Richter et al.
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.
2002/0143997 A1 10/2002 Huang et al.
2002/0162090 A1 10/2002 Parnell et al.
2002/0165742 A1 11/2002 Robbins
2003/0004971 A1 1/2003 Gong
2003/0018705 A1 1/2003 Chen et al.
2003/0018830 A1 1/2003 Chen et al.
2003/0066031 A1 4/2003 Laane et al.
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker et al.
2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.

(56) References Cited

U.S. PATENT DOCUMENTS

| | | | |
|---|---|---|---|
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2012/0315881 A1* | 12/2012 | Woloshyn | G06F 3/0488 455/412.2 |
| 2013/0066964 A1* | 3/2013 | Odio | G06Q 50/01 709/204 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0359537 A1 | 12/2014 | Jackobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0142596 A1 | 5/2015 | Jakobson et al. | |
| 2015/0172563 A1 | 6/2015 | Jakobson et al. | |

* cited by examiner

CAPTURING INFORMATION REGARDING AN INTERACTION TO A DATABASE

PRIORITY DATA

This patent document claims priority to and commonly assigned U.S. Provisional Patent Application No. 61/807,880, titled "System and Method for Capturing a Real-World Moment," by Chandran et al., filed on Apr. 3, 2013, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to capturing information regarding various interactions and, more specifically, to techniques for capturing information to a database of an on-demand database service.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for capturing interaction information. These drawings in no way limit any changes in form and detail that may be made by one skilled in the art without departing from the spirit and scope of the disclosed implementations.

DETAILED DESCRIPTION

Figure 1A:
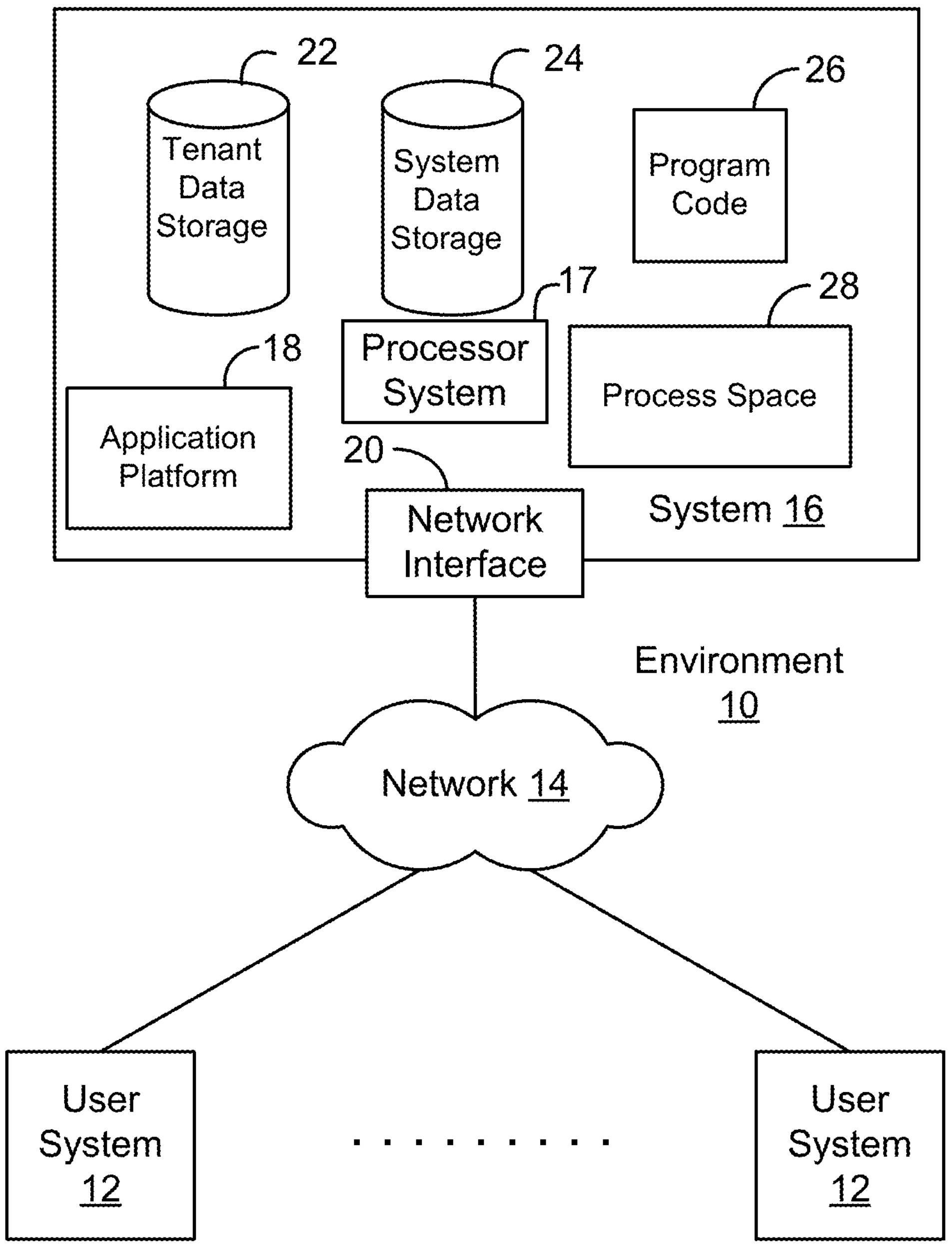
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for capturing information regarding a real-world moment to a database in an on-demand database service. The on-demand database service can include online business applications and online social networks, also referred to herein as a social networking system.

Online social networks are increasingly becoming a common way to facilitate communication among people, any of whom can be recognized as users of a social networking system. One example of an online social network is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some online social networks can be implemented in various settings, including organizations. For instance, an online social network can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some online social networks, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Typically, content stored outside of an on-demand database service may be difficult to access from the on-demand database service and may be limited to having to move, replicate, or provide a hyperlink to the content. In addition, access to such content may be limited as various data repositories have different APIs for access and authentication requirements. Furthermore, various content files and folders may be scattered across a plurality of different data sources. Thus, users may be limited in their ability to access, collaborate on, share, modify, comment on, search, view, and otherwise interact with content stored in external data sources in an on-demand database service.

As more and more users and organizations move toward more collaborative sharing models to communicate and conduct business, there is a desire to better share, collect, and utilize information. In a consumer space, users may record information to capture moments for themselves, for the purpose of sharing, or for revisiting the moment later for nostalgia. The users may record information expressing sentiments about moments they experience with other people, products, and services. In some instances, recording such information may be cumbersome and may not lead to very useful data.

Some of the disclosed systems, apparatus, methods, and computer readable storage media can capture information regarding moments occurring in the physical world, referred to herein as "real-world" moments, in a relatively frictionless manner and leverage that information to ascertain trends, patterns, and data that may be useful to the user, other users, and organizations. By way of example, a user may be spurred to capture information regarding a real-world moment using a client device such as a smartphone. The user can be spurred by a trigger, such as the end of a phone call or the end of a scheduled calendar meeting. The client device may be context aware, meaning that some information about the user's environment may be preloaded. This can include a user's location, a time, and a date, among others. The user can record information to a data object or custom object representing the real-world moment. The recorded information can include an identity of the person, product, or service the user shared the real-world moment with, and a sentiment about the real-world moment. The recorded information can be stored to the data object or custom object in a database of an on-demand database service, such as an online social network. The recorded information can be aggregated and augmented with other information, including previously recorded information involving the same person, product, or service. Thus, a profile of that person, product, or service can be developed that can show useful trends, patterns, and data regarding interactions with that person, product, or service.

In a business context, the aggregated and augmented information can be useful for an organization. For example, such information about the interactions that occur with people can provide answers to questions such as: who is a top performer? Who are the most inspiring people in a company? Who is able to help me get connected to someone? Who is able to teach me something new? Are people more likely to get inspired at work or at home? Where are people most productive? Are people more likely to get inspired during a certain time of day? The aggregated and augmented information can be surfaced to users that can lead to insights and decision recommendations. How employees work, how teams are built and structured, and how decisions are made in an organization may be affected.

Another business context where such recording, aggregating, and augmenting of information can be useful includes the health care context. For example, a patient or doctor may record information regarding a moment based on a trigger from a health care device, a monitor, or at the end of a checkup or hospital visit. If a patient suffers from a particular ailment like depression, the patient or doctor may record information when the ailment flares up. When the recorded information is aggregated and augmented with other information, insights such as where the patient usually is and what time of day it is when the depression flares up the most can be ascertained.

The disclosed implementations are not limited to strictly the business context, but may be implemented in a consumer environment. For example, a user may capture information regarding a moment with a product in a retail store. Triggers may initiate the recording of information such as user entering a store, during checkout, or scanning a barcode, quick response (QR) code, or stock-keeping unit (SKU). A sentiment can be recorded that can be augmented with other information about the product. In another example, a user may be traveling on a mode of transportation, such as a car, a train, an airplane, a bus, etc. A trigger may be programmed to initiate recording of information regarding the moment, where the trigger can include an accident, a culmination of a journey, certain global positioning system (GPS) coordinates, ignition, etc. In yet another example, a user may be using a fitness tracking device and trigger the process for recording information when certain conditions are met. In still yet another example, recording of information regarding a moment may occur for social events and interactions, where recording of information may be triggered at the end of a dinner, a concert, a party, or a date using applications such as Foursquare, Yelp, and Opentable. In addition, the recording of information regarding a moment can be triggered by seeing/capturing specific images or by voice command with an electronic device, such as Google Glass.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
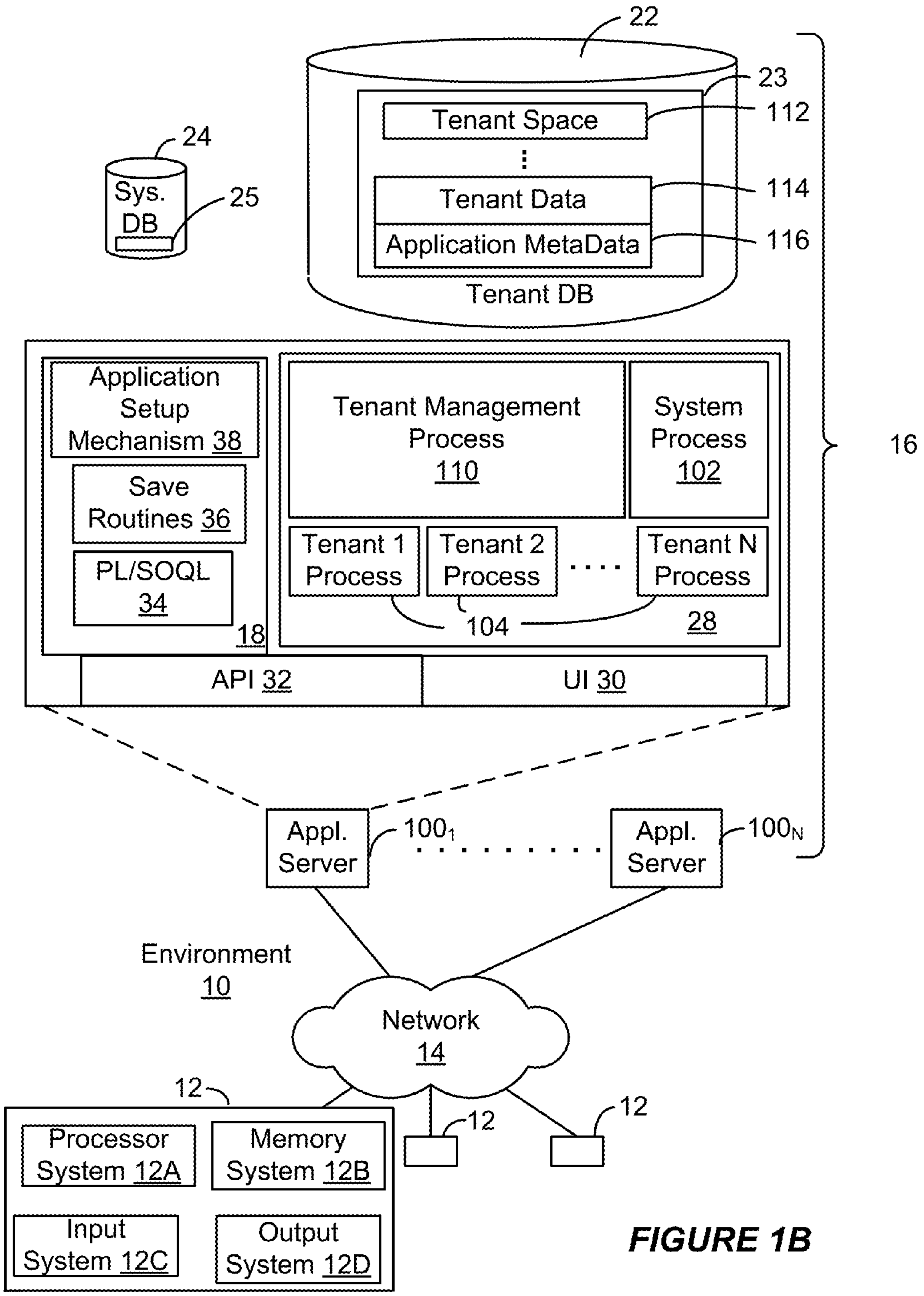
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oraclel databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
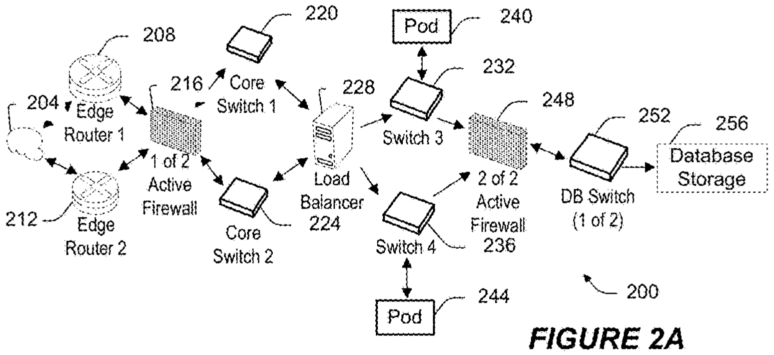
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
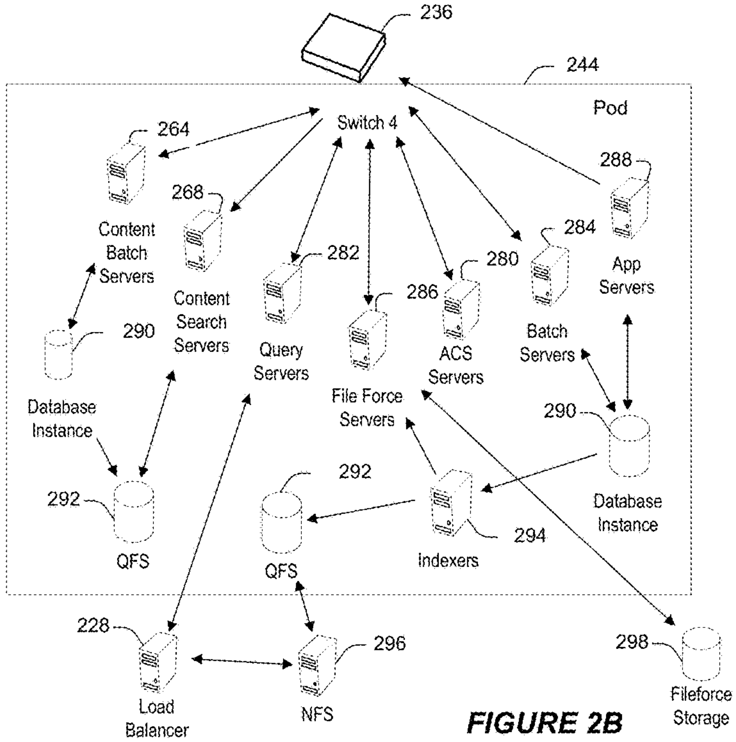
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 3-8B. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Capturing Information Regarding a Real-World Moment

With improvements in electronic devices, including smartphone technologies, users of the electronic devices are able to interact with their environment and capture information regarding moments in their lives. Typically, users capture such information for the purpose of sharing with others or revisiting the moments later for nostalgia. The proliferation of social media platforms has further increased the sharing of information across communities and organizations.

When capturing information on a client device, including smartphones, laptops, tablets, wearable display devices, and desktop computers, a user may experience an undesirable amount of "friction" or effort in order to capture such information. In other words, the user may be discouraged from capturing information if the actions are too time-consuming for the user. Moreover, the user may not think to capture information regarding a real-world moment unless a trigger or stimulus initiates the process of capturing such information. The trigger may be programmed or otherwise defined by the user on the client device. When the information regarding the real-world moment is captured by the client device, the information can be stored in a database, where it can be aggregated and augmented with other information to ascertain trends, patterns, and other useful information about the moment and about anyone or anything involved in the moment.

In the context of a business or organization, a user may experience several real-world moments involving people, products, services, etc. Real-world moments in a business setting can include, for example, meetings, phone calls, conferences, presentations, employee interactions, client interactions, business trips, and various other interactions. The business context may further encompass several different settings, including interactions between a patient and a doctor, a customer interaction with a product, a patron's interaction with a store, a user's experience with a form of transportation, and so forth. It may be desirable to record information regarding such interactions in a relatively frictionless manner to a database of an on-demand database service. Information may be aggregated and augmented with all previously recorded interactions involving the same person, product, or service a user interacted with. The aggregated and augmented information may subsequently provide useful data regarding our interactions with such people, products, and services. A profile of a person, product, or service can be ascertained leading to potential insights and decision recommendations as users continually provide information regarding their interactions with the person, product, or service.

Figure 3:
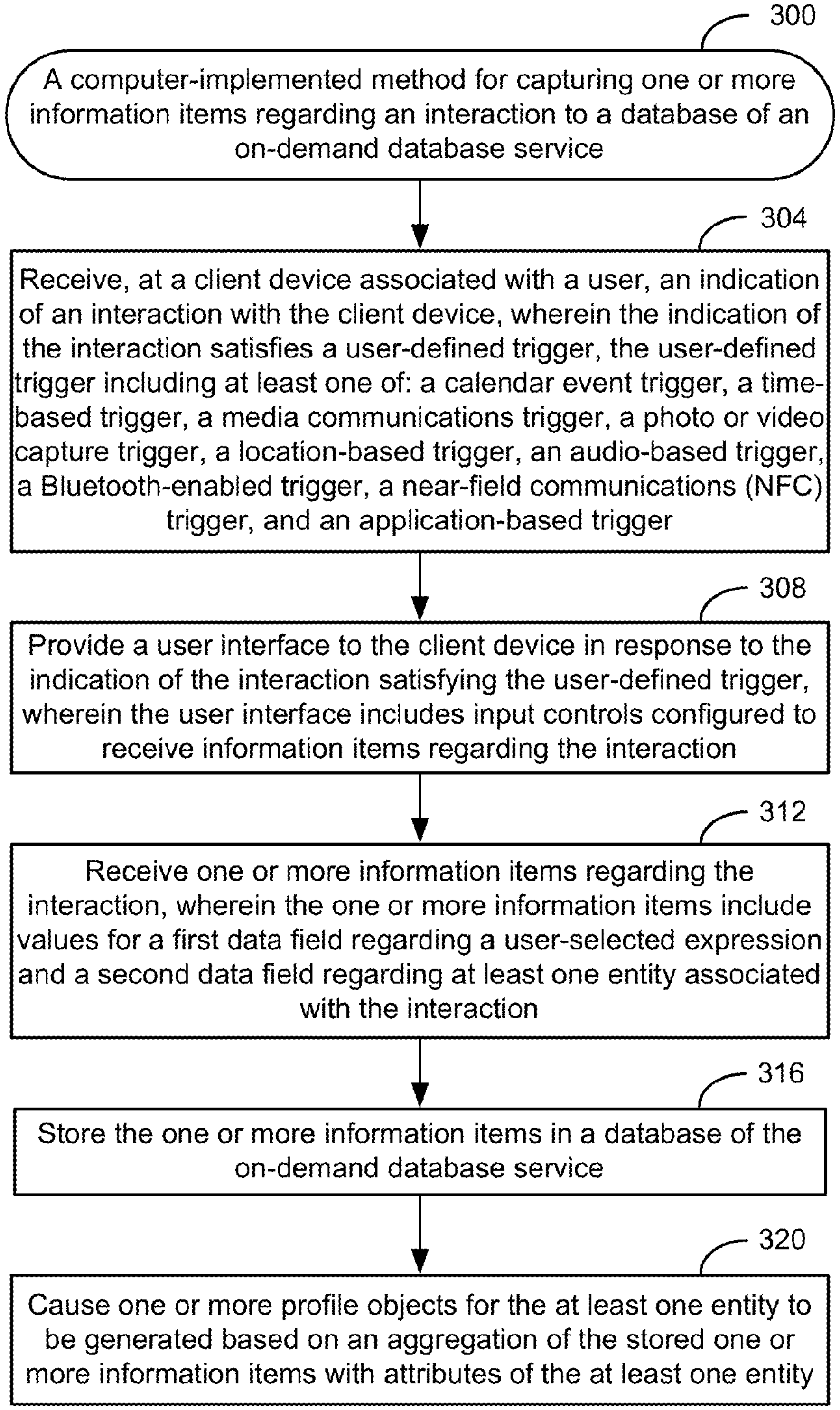
FIG. 3 shows a flowchart of an example of a computer implemented method 300 for capturing one or more information items regarding an interaction to a database of an on-demand database service according to some implementations.

FIG. 3 shows a flowchart of an example of a computer implemented method 300 for capturing one or more information items regarding an interaction to a database of an on-demand database service. The method 300 shows a high-level overview of the types of operations that may be performed capturing information regarding an interaction to a database of an on-demand database service. The operations in the method 300 may be performed in different orders and/or with different, fewer, or additional operations. The method 300 may be described with reference to some examples as illustrated in FIGS. 4-8B.

At block 304, an indication of an interaction with a client device associated with a user is received at the client device, where the indication of the interaction satisfies a user-defined trigger, the user-defined trigger including at least one of: a calendar event trigger, a time-based trigger, a media communications trigger, a photo or video capture trigger, a location-based trigger, an audio-based trigger, a Bluetooth-enabled trigger, a near-field communications (NFC) trigger, an application-based trigger, and combinations thereof. It is understood that the aforementioned user-defined triggers and combinations of triggers are meant to be illustrative and are not intended to be limiting in scope. In some implementations, the user-defined trigger is a calendar event trigger.

A client device can include smartphone, a cell phone, a wearable display device, a laptop, a tablet, a desktop computer, a workstation, or any computing device. A wearable display device can include, for example, a smart watch or smart glasses. In some implementations, the client device may also be part of one or more connected devices. For example, the client device can be part of one of a vehicle, a consumer appliance, a sensor, a robot, and an electronic product.

A client device may be receiving and processing numerous operations and interactions, where some of the operations and interactions may correspond to real-world moments. The client device may be programmed or otherwise configured to detect certain kinds of interactions with the client device that correspond to real-world moments. For example, a calendar application may provide notifications to the client device regarding meetings, a call log may provide information regarding phone calls, a camera application may capture photographs or video of a user's environment, an email application may provide information regarding email correspondence, a location-based feature may provide a location of the client device, and so forth. Any of these interactions with the client device may register as a real-world moment that a user may want to capture information about.

In some implementations, the kinds of interactions with the client device that correspond to real-world moments may be defined by the client device. In some implementations, the kinds of interactions with the client device that correspond to real-world moments may be defined by the user associated with the client device. When the indication of the interaction satisfies a user-defined trigger, a user interface capable of recording information regarding a real-world moment can be provided to the client device. For example, an application for recording information regarding a real-world moment can be initiated. Such an application may be referred to as a "Moments App." The user-defined trigger can be set to correspond to a particular event or interaction occurring on the client device. In some implementations, a user-defined trigger can be set to the end of a workday or the end of a call. In some implementations, a user-defined trigger can be set to after taking a photograph or after checking into a venue with Foursquare. Additional examples of user-defined triggers can be described with reference to FIGS. 6A-6F.

Figure 6A:
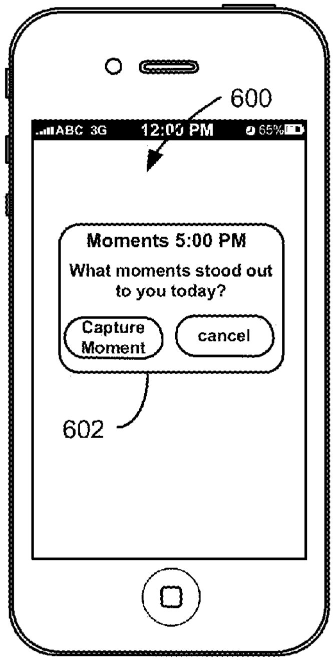
FIGS. 6A-6F show examples of user interfaces each responsive to different indications of interactions with the client device satisfying user-defined triggers according to some implementations.

FIGS. 6A-6F show examples of user interfaces each responsive to different indications of interactions with the client device satisfying user-defined triggers according to some implementations. FIG. 6A shows an example of a time-based trigger. A user interface 600 can display a notification or pop-up window 602 at the end of a work day, where a user can choose to record information corresponding to one or more real-world moments. Other notification types can include, for example, LED blinking (e.g., color, frequency, etc.), lock screen notifications, notification bars, sound notifications, and icon badging (e.g., displaying a number of pending notifications). The notification 602 can appear in the user interface 600 responsive to detecting that 5:00 pm has arrived on the client device. The client device can be programmed or otherwise configured to cause the notification 602 to appear according to the time of day, allowing the user to decide whether or not he wants to record any real-world moments using the Moments App. It will be understood by a person of ordinary skill in the art that the client device is not limited to presenting pop-up windows, but may present any audio or visual component from the client device that allows a user to initiate recording information regarding a real-world moment.

Figure 6B:
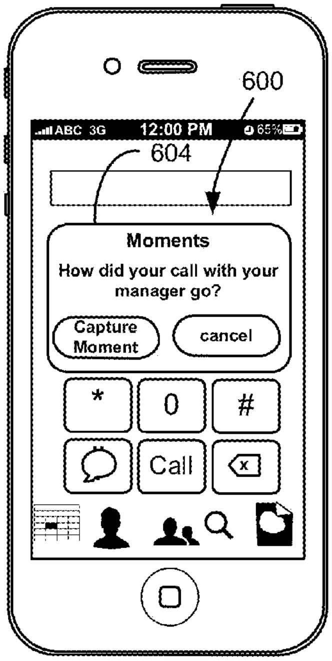

FIG. 6B shows an example of media communications trigger. The user interface 600 can display a notification or pop-up window 604 at the end of a phone call, allowing the user to decide whether or not to record information about the phone call. When the client device detects the termination of a phone call and who the phone call was with, the notification 604 may be presented in the user interface 600. Such notifications 604 may appear not just at the end of phone calls, but with any other media communications occurring on the client device. Media communications can also include email, social, short message service (SMS), multimedia message service (MMS), and chat.

Figure 6C:
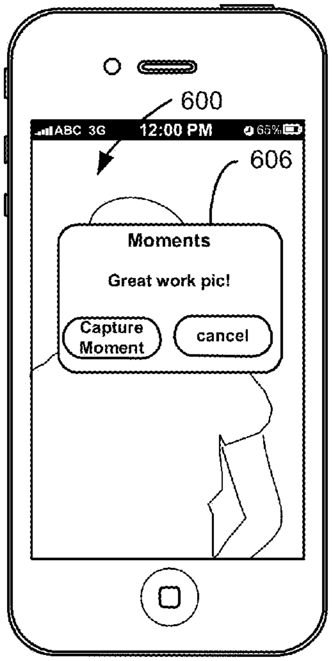

FIG. 6C shows an example of a photo or video capture trigger. The user interface 600 can display a notification or pop-up window 606 after a photograph is taken or a video recorded. The user can decide whether to record information regarding the photo or video-captured moment.

Figure 6D:
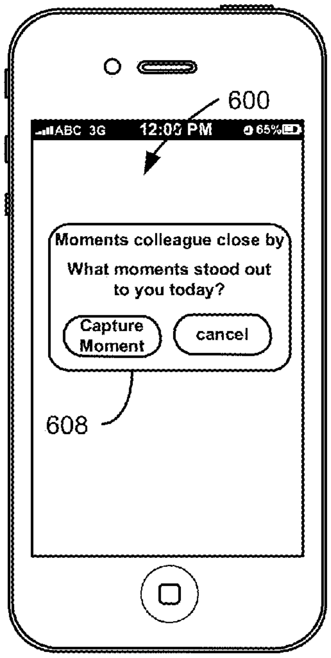

FIG. 6D shows an example of a location-based trigger. The user interface 600 can display a notification or pop-up window 608 when conditions of a geolocation service are satisfied. Geolocation services such as Foursquare allow users to check in to venues and detect other users in proximity. Here, the notification 608 may appear when the client device detects that a colleague of the user checked in to the same venue recently, allowing the user to decide if he wants to record information for his experience at the venue. Other location-based triggers can include termination of a trip (such as after a plane ride, train ride, car ride, etc.), entering a business location, arriving home, and encountering a friend, among other location-based triggers.

Figure 6E:
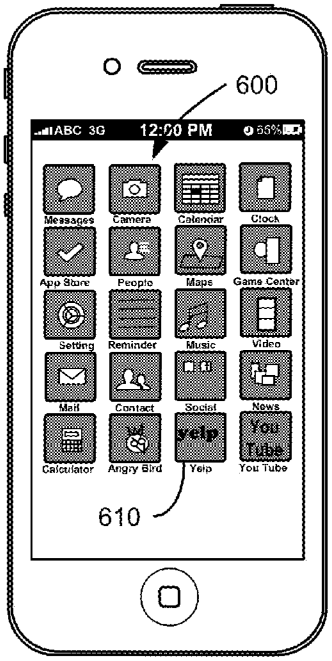

FIG. 6E shows an example of an application-based trigger. A client device may include a plurality of applications 610 that can take advantage of features and functions of the client device. For example, health monitoring and fitness applications can measure movements, exercise, heart rate, respiration rate, blood sugar, skin conductance, periods of rest, etc. Audio applications can measure changes in a sound environment, and light meter applications can measure changes of light in an ambient environment. Applications can scan barcode, QR code, and SKU. Applications for gaming or entertainment can be detected (such as a twitch.tv upload, a Playstation network login, World of Warcraft login, etc.). Applications such as If This Then That (IFTT) can be programmed to trigger certain actions on the client device. In fact, the client device can be configured with any existing applications to trigger recording information regarding a real-world moment when certain conditions measured/detected by the applications are met.

Figure 6F:
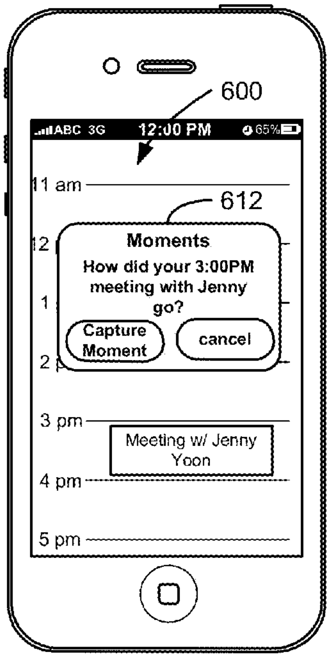

FIG. 6F shows an example of a calendar event trigger. The client device may be synchronized with a calendar-type application so that a notification 612 may be presented in the user interface 600 upon occurrence of a calendar event. In this case, the client device may detected that a meeting with Jenny Yoon was scheduled for 3-4 pm from a calendar application. The client device may cause the notification 612 to appear in the user interface 600 to allow the user to decide if he wants to record information about the meeting with Jenny Yoon. Calendar event triggers can also include applications that ascertain scheduled events, such as Eventbrite and Meetups.

In some implementations, the user-defined triggers can include Bluetooth-enabled triggers and near-field communications (NFC) triggers. When the client device connects with other Bluetooth-enabled devices, the connection may present a change in condition that causes the client device to present a notification that allows the user to decide whether to record information regarding a real-world moment. When the client device is used with other enabled devices that communicate by NFC, such as swiping the client device at a checkout lane in a grocery store, waving the client device over a display at a museum, or "bumping" phones with a friend, the conditions may cause the client device to present a notification for deciding whether or not to capture information. Other connections from any number of different communications protocols can represent conditions that may cause the client device to present a notification for deciding whether or not to capture information.

Returning to FIG. 3, at block 308, a user interface is provided to the client device in response to the indication of the interaction satisfying the user-defined trigger, where the user interface includes input controls configured to receive information items regarding the interaction. To avoid having the user independently drive the process of recording information corresponding to real-world moments, satisfaction of user-defined triggers can drive the recording of such information. Hence, the user does not necessarily commence the recording of information corresponding to real-world moments by his own initiative, but can configure the client device to commence the recording of information when certain conditions on the client device are met.

While the recording of information corresponding to a real-world moment relates to occurrences that a user experiences in real life, the real-world moment takes place on the client device as an indication of an interaction that satisfies a user-defined trigger. Accordingly, the recording of information regards the interaction with the client device, though the recorded information may be descriptive of aspects of the real-world moment. In other words, information regarding the interaction with client device may be used interchangeably with information regarding the real-world moment.

The user interface surfaces input controls that allow a user to input information regarding the interaction with the client device. The input controls may be audio or visual controls that can receive information about the interaction. In some implementations, the input controls may be capable of allowing a user to efficiently record information about the interaction to provide a relatively frictionless experience. When a user records information corresponding to a real-world moment, recording such information may require substantial amounts of effort from the user, as may be experienced in composing blog entries and social posts. However, the input controls in the user interface may allow the user to quickly record information regarding the interaction with minimal effort. For example, instead of or in addition to allowing a user to enter characters into a text box, input controls may be provided to allow the user to select from predefined options in predetermined data fields. The user interface can permit efficient advancement for recording information by reducing the amount of friction typically experienced by a user when recording information.

In some implementations, the input controls may be presented across multiple pages or across a single page. Input controls may include any appropriate input control for receiving information, including but not limited to text fields, text boxes, drop-down menus, list, buttons, icons, images, data grids, checkboxes, combination boxes, and radio buttons. In some implementations, each of the input controls may receive values for predetermined data fields. The data fields may refer to data categories that can be logically arranged in columns, rows, or fields in a database table. Examples of data fields for a database table regarding an interaction with the client device can include names of entities involved in the interaction, a time of the interaction, a date of the interaction, a location of the interaction, a subjective expression or disposition about the interaction, and a type of interaction, among others. The input controls may receive information for any of the aforementioned data fields. In some instances, however, information for some of the data fields may be automatically generated by the client device. The client device may be capable of obtaining information from the indication of the interaction with the client device and from ascertaining information from its environment. Such information may or may not be displayed in the user interface. Examples of automatically generated information may include a time, a date, and a location.

At block 312, one or more information items are received regarding the interaction, where the one or more information items include values for a first data field regarding a user-selected expression and a second data field regarding at least one entity associated with the interaction. The one or more information items can be received by the client device. Some of the one or more information items may include information items received from a user input with the input controls in the user interface. In some implementations, some of the one or more information items may include information items received from the client device, such as values for data fields ascertained by the client device upon receiving the indication of the interaction with the client device and data regarding its environment.

The one or more information items can include values for a first data field regarding a user-selected expression. The expression can represent the user's attitude, sentiment, mood, feelings, emotions, thoughts, disposition, or other generalized feedback regarding the real-world moment. More specifically, the user-selected expression can represent the user's attitude, sentiment, mood, feelings, emotions, thoughts, disposition, or other generalized feedback regarding the user's interaction with at least another entity in the real-world moment. In some implementations, the user-selected expression may be selected from a plurality of predefined icons, where the input controls are capable of receiving a user input that selects one of the predefined icons. It will be understood by a person of ordinary skill in the art that the user-selected expression may not describe just an emotion, but may describe behavior and other aspects of the real-world moment.

Figure 7:
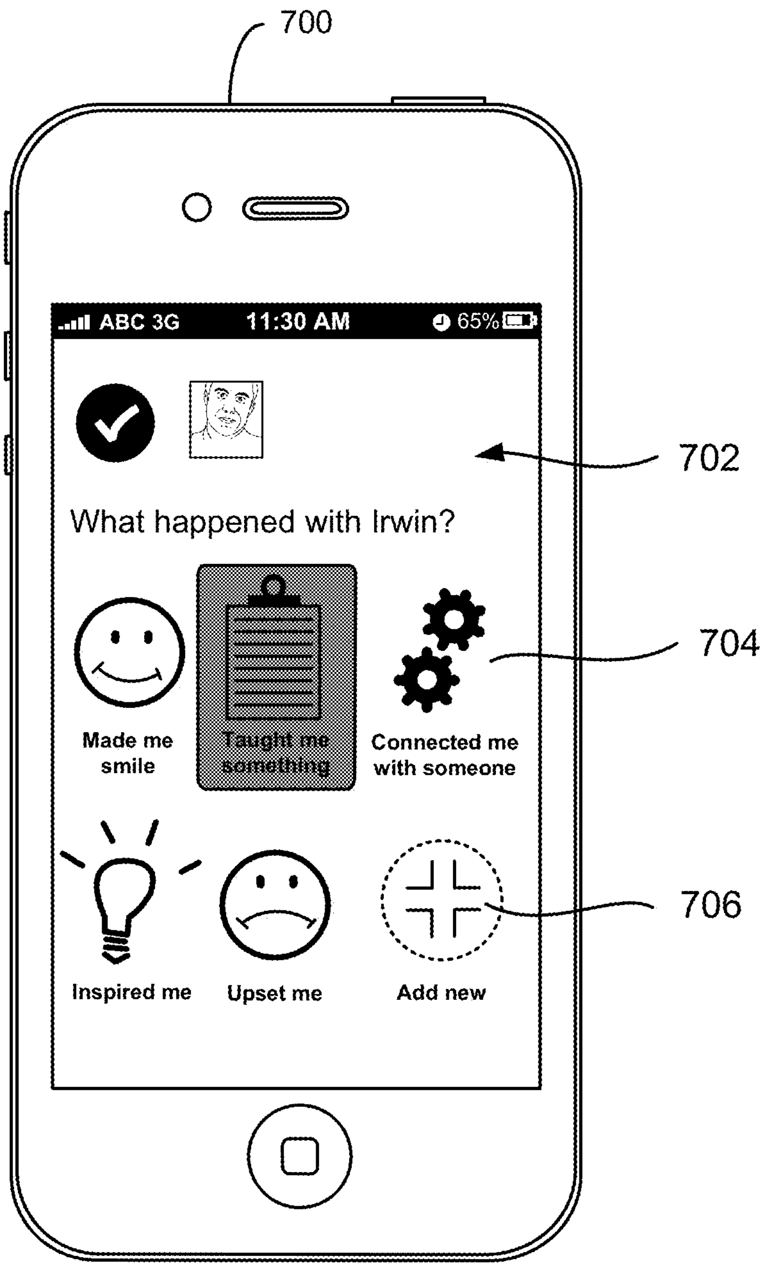
FIG. 7 shows an example of a user interface for providing a user-selected expression regarding a real-world moment according to some implementations.

FIG. 7 shows an example of a user interface for providing a user-selected expression regarding a real-world moment according to some implementations. A client device 700 can include a display configured to display a user interface 702. The user interface 702 can be displayed when an application for recording information regarding real-world moments to a database of an on-demand database service is accessed on the client device 700. The user interface 702 can include a plurality of predefined selectable icons 704, where each of the selectable icons 704 can represent an expression or disposition regarding a real-world moment. As illustrated in the example in FIG. 7, the expressions for the selectable icons 704 include "Made me smile," "Taught me something," "Connected me with someone," "Inspired me," and "Upset me." Each of the selectable icons 704 may be preloaded with the application. Additional expressions can be added to the plurality of selectable icons 704 by selecting an "Add New" button 706.

In some implementations, each of the selectable icons 704 can be predefined by a user or programmed by the application. After an interaction with the client device 700 triggers the application, the user interface 702 can be displayed with the plurality of selectable icons 704. In some implementations, the user interface 702 may be provided after receiving information regarding the real-world moment, including the entities involved in the real-world moment. For example, a user can previously enter information that Irwin was involved in real-world moment before the client device 700 displays the user interface 702. In another example, the client device 700 can automatically determine that Irwin was involved in the real-world moment from the interaction with the client device without having to wait for a user to enter such information.

When the entity or entities involved in the real-world moment are determined, the client device 700 can generate the user interface 702 to include an inquiry regarding a user's expression or disposition toward the entity or entities. Here, the user interface 702 can include an inquiry requesting a user's expression or disposition toward Irwin with respect to the real-world moment. The user may select at least one of the selectable icons 704 or the "Add New" button 706 to provide the user's expression or disposition toward Irwin with respect to the real-world moment. The user's expression or disposition toward Irwin can be saved to a database in an on-demand database service. Such information can be aggregated and augmented with all of the user's interactions with Irwin to generate a report of Irwin.

While the example in FIG. 7 shows a user interface with selectable icons 704 to provide values for a user-selected expression corresponding to the real-world moment, values for the user-selected expression can be provided from any number of appropriate input controls, including but not limited to voice-activated inputs, drop-down menus, lists, buttons, text fields, text boxes, and the like.

The one or more information items can include values for a second data field regarding at least one entity associated with the interaction. In some implementations, the at least one entity can include a contact, product, or service. Any of these entities may participate in the real-world moment that the user seeks to record information about. Real-world moments that a user experiences may not only include interactions with people, groups, and organizations, but may also include interactions with products and services. It may be desirable to capture information regarding a user's interaction with certain contacts, products, and services to accumulate knowledge about them, and to ascertain trends, patterns, and useful data. In some implementations, the client device may be able to access a database storing information for the contact, product, or service. The client device may be capable of performing a search and retrieving such information for the contact, product, or service. In some implementations, the user can cause the client device to retrieve contact, product, or service information from a local database in the client device, from an online social network, or a data repository service. For example, the contact, product, or service information can be data objects stored in a local database, in a shared database accessible in Chatter, LinkedIn, Facebook, Google+, Yammer, Jive, or Twitter, or in an external database stored in Outlook, Gmail, and Yahoo. The client device may be synchronized with one or more databases to access information for the at least one entity associated with the interaction.

Figure 8A:
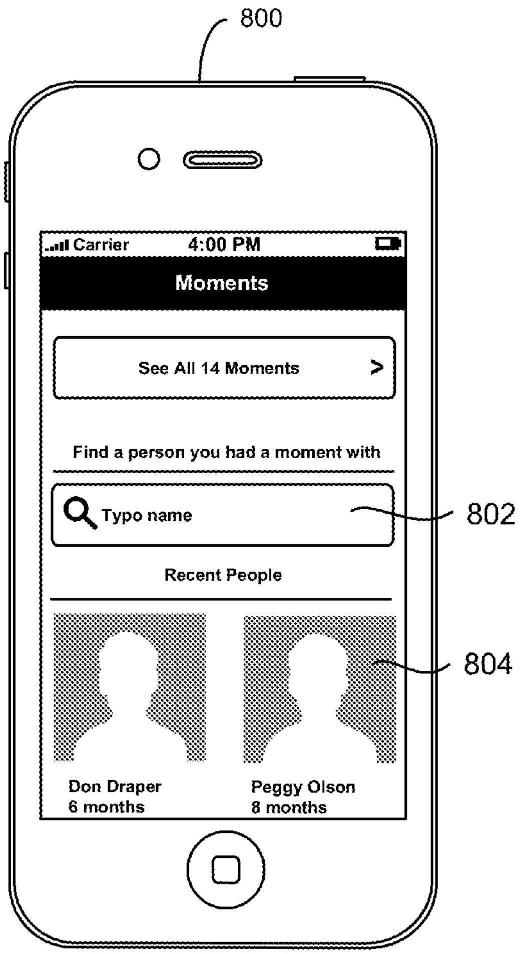
FIGS. 8A-8B show examples of user interfaces for providing at least one entity involved in a real-world moment according to some implementations.
Figure 8B:
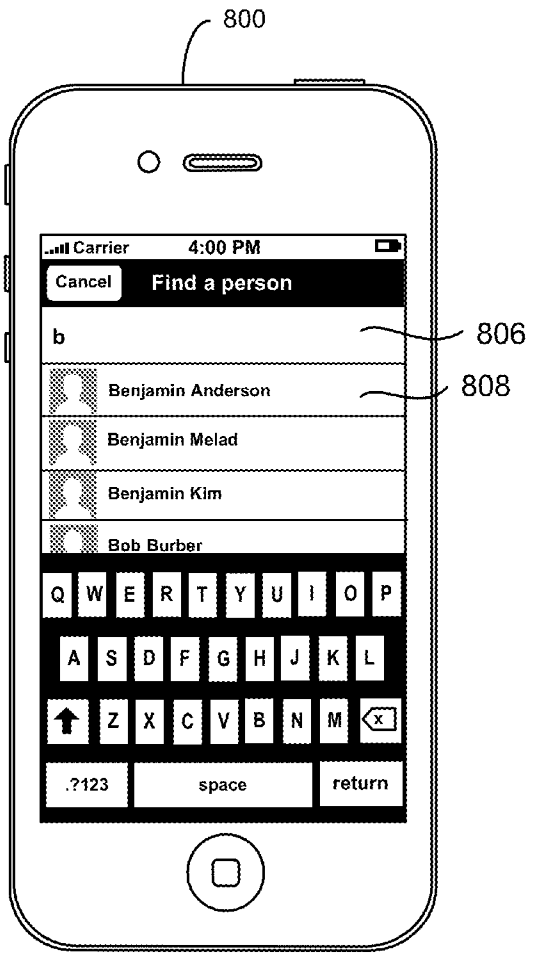

FIGS. 8A-8B show examples of user interfaces for providing one or more entities involved in a real-world moment according to some implementations. FIG. 8A shows an example of a user interface with a search query 802 for entering a name of a person involved in the real-world moment. If the search query 802 does not return any results, the name may be entered into a local database of the client device 800. Otherwise, the search query 802 may return results of matching or similarly matching names of contacts stored in the local database of the client device 800 and/or database(s) synchronized with the client device 800. The user interface may further include contacts 804 of names of people the user had recently shared real-world moments with. In some instances, the name of the contact 804 may be included along with additional information, such as when the last real-world moment occurred with the contact 804, the number of real-world moments that took place with the contact 804, and the most frequent types of interactions that took place with the contact 804.

FIG. 8B shows an example of a user interface with a text box 806 for entering a name of a person involved in a real-world moment, and contacts 808 that may match the name in the text box 806. Here, as the user provides character-based inputs into the text box 806, results may be simultaneously displayed or displayed after completion of the entry in the text box 806. The results may correspond to a list of contacts 808 stored in a local database of the client device 800 and/or database(s) synchronized with the client device 800.

Though the examples in FIGS. 8A-8B illustrate input controls for receiving values regarding the at least one entity associated with the interaction, the values regarding the at least one entity associated with the interaction may be automatically generated. For example, a calendar event trigger, a media communications trigger, a location-based trigger, an NFC trigger, or other appropriate user-defined trigger may permit the client device to ascertain the values regarding the at least one entity associated with the interaction. This may reduce the amount of friction that a user may undergo in recording information corresponding to a real-world moment.

The one or more information items can include values for additional data fields. In some implementations, the additional data fields may be regarding one or more of a location, a time, a date, the user, and a type of interaction with the client device. The type of interaction with the client device can include phone calls, meetings, business trips, etc. that can be ascertained by the nature of the interaction with the client device. In some implementations, some of the values for the additional data fields may be received by user input. In some implementations, some of the values for the additional data fields may be ascertained by the client device automatically. This can reduce the amount of friction that a user may undergo in recording information corresponding to a real-world moment.

As users record their expressions or dispositions corresponding to a real-world moment, those expressions or dispositions can be tied not only to the at least one entity participating in the real-world moment, but also tied to the time of day, the location, and the type of interaction. For example, trends and patterns may be generated to show a user having more encounters with certain contacts at a specific location than other locations, more types of interactions with a certain contact than other contacts, more user-selected expressions at certain times of the day than at other times of the day, more user-selected expressions for certain types of interactions than other types of interaction, and so forth. Providing information for the additional data fields can provide more knowledge about the user as well as the at least one entity involved in the real-world moment when that information is aggregated and augmented with other information.

Returning to FIG. 3, at block 316, the one or more information items may be stored in a database of the on-demand database service. In some implementations, the one or more information items may generate a custom object, such as a micro-moment object. In some implementations, the database can include the custom object representing the real-world moment, where each row of the custom object contains the value(s) for a column defined by the data fields. By way of an example, a calendar event of a meeting with Irwin can satisfy a user-defined trigger, and an information item can be received that provides a value of a user-selected expression regarding the meeting, such as "made me smile," as well as the name of the contact involved in the meeting, namely "Irwin." The information item can provide these values in a row of a custom object to be stored in a database of an on-demand database service, such as Chatter®.

In some implementations, the database can include a custom object representing all real-world moments with the user, all real-world moments with the user and the at least one entity, all real-world moments with the at least one entity, or all real-world moments defined according to one or more data fields. Each row of the custom object contains the value(s) for each column defined by the data fields, where each row can represent a specific real-world moment. In other words, each of the real-world moments may have information recorded to the custom object by the user and by other users. By way of an example, one of the rows in the custom object can correspond to the user's meeting with Irwin as described above, and other rows in the custom object can correspond to other real-world moments with Irwin experienced by the user. In some implementations, the database may be shared across many users in a multitenant database environment. This can provide shared knowledge regarding real-world moments with Irwin or the user.

In some implementations, the on-demand database service can include cloud-based services, including online business applications and online social networks. An online social network, such as Chatter®, facilitates communication and collaboration among entities. The online social network can be managed and controlled by a database service provider, such as salesforce.com. The online social network may also facilitate usage of other online services, including CRM services and database management services. The on-demand database services can also include online business applications or services, including but not limited to task management services (e.g., Do.com™), CRM services (e.g., Salescloud®), customer services (Service Cloud® and Desk.com™), performance management services (e.g., Rypple® and work.com), social marketing services (e.g., Radian6® and Buddy Media™), content and/or data management services (e.g., Database.com™, Data.com®), platform services (e.g., Site.com™, Heroku™, Force.com®, AppExchange®). The one or more information items provided to the online social network or online business application can advance the sharing of knowledge that can be leveraged to obtain useful data, patterns, and trends.

In some implementations, the method 300 may further include publishing the one or more information items to a feed of an online social network. Thus, information recorded about the real-world moment may be shared across a social network. The one or more information items may be published in a feed item of the feed. The feed item may include values for the user, the user-selected expression, and the at least one entity associated with the interaction. In some implementations, the feed item can include components for liking/disliking and commenting on the feed item. The feed can include a profile feed, a record feed, or a news feed. For example, the one or more information items can be published to the user's news feed or an organization's record feed.

In some implementations, the method 300 may further include sending a notification of the one or more information items to the at least one entity associated with the interaction. Therefore, participants in a real-world moment with the user can be notified when the user records information about his interaction with the participants. The at least one entity may receive the notification as a media communication, such as an email, SMS message, MMS message, chat, or social post. In some implementations, the notification may include a link to download the application for recording information regarding a real-world moment.

At block 320, one or more profile objects are caused to be generated based on an aggregation of the stored one or more information items with attributes of the at least one entity. When the one or more information items are stored in the database, the one or more information items may be combined and otherwise aggregated with attributes of the at least one entity. In some implementations, the attributes of the at least one entity include previously recorded information items by the user with the at least one entity. In some implementations, the attributes of the least one entity include previously recorded information items by other users with the at least one entity. In some implementations, the attributes of the at least one entity include metadata associated with the at least one entity. When the stored one or more information items are aggregated with the attributes of the at least one entity, useful data, patterns, and trends may be ascertained from the aggregation. An example would be to infer an influence graph from a person based on all their moments. Other useful data and patterns could provide the circumstances in which someone is most inspired. Such circumstances can include the time-of-day, location, the person I'm meeting with, whether the circumstance is in-person or a phone call, etc. From such data, someone can ascertain who he should spend more time with or less time with.

The useful data, patterns, and trends may be represented in one or more profile objects for the at least one entity, which can provide a rich profile of the at least one entity. Hence, data-driven insights may be ascertained about the at least one entity based on the aggregation.

In some implementations, the method 300 can further include providing a visual representation of the one or more profile objects in the user interface of the client device. In some instances, the visual representation can accompany the publication of the one or more information items in a feed of an online social network. The one or more profile objects may include statistics of the stored one or more information items with the attributes of the at least one entity. Visual representations of the one or more profile objects can include charts, graphs, timelines, and tables that incorporate the aforementioned statistics. In some implementations, the visual representation of the one or more profile objects may include a summary of the aggregation with the visual representation. For example, a chart may provide statistics that indicate that the user learns from Irwin the most but interacts with him the least.

In some implementations, the method 300 can further include retrieving the attributes of the at least one entity from the database of the on-demand database service before causing the one or more profile objects for the at least one entity to be generated. The client device may be in communication with the database of the on-demand database service to retrieve attributes of the at least one entity. Previously recorded information by the user or by other users may be accessed in the database of the on-demand database service to deliver more knowledge about the at least one entity to the user. In some implementations, the retrieval of the attributes of the at least one entity from the database of the on-demand database service can occur before the one or more information items are stored in the database of the on-demand database service.

When the attributes of the at least one entity are retrieved, the attributes may be aggregated with the stored one or more information items. The aggregation may combine and augment information for first real-world moments with information for second real-world moments. The aforementioned one or more information items may reference a first real-world moment with the at least one entity. The one or more information items include a first interaction data item for the at least one entity with respect to the user. The aforementioned retrieved attributes of the at least one entity may reference second real-world moments with the at least one entity. In some implementations, the retrieved attributes include a second interaction data item for the at least one entity with respect to the user. In other words, the aggregation combines the presently recorded information by the user for the present real-world moment with previously recorded information by the user for a previous real-world moment.

The on-demand database service may be configured to analyze the aggregation to provide analytics with respect to one of the data fields, such as with respect to the at least one entity. Analytics may be considered the development and communication of meaningful patterns in data that can be derived through the application of statistical models and analysis. Such application of statistical models and analysis in analytics can lead to decision recommendations and/or insights. In analytics, content can continually be created based on different data conditions provided by the on-demand database service. As an example, analytics may reveal patterns and trends developing about a person, organization, group, product, or service. In some implementations, the one or more profile objects include analytics according to one of the first, second, and additional data fields. Therefore, the analytics of the aggregation may be based on the user-selected expression, the at least one entity, the location, the time, the date, the user, and the type of interaction with the client device. This can provide analytics for all real-world moments a user has with respect to the at least one entity, all real-world moments a user has at a particular location, all real-world moments a user has at a time of day or date, all real-world moments a user has of a certain type of interaction, etc. In a business context, this kind of data can answer questions such as: who are the most inspiring people at the company? Who has ideas that get people excited? Who can teach me something new? Who is a great mentor? Where is a person more likely to get inspired? Where is a person more likely to learn something new? What time of day is a person likely to get inspired?

In some implementations, the method 300 can further include determining a performance metric based on the aggregation of the stored information with the attributes of the at least one entity, where the performance metric includes statistics of the at least one entity according to one of the first, second, and additional data fields. The performance metric may be generated by applying a statistical model to the number of user-selected expressions or dispositions with respect to one of the data fields, such as the at least one entity. For instance, a performance metric may be generated after sending the one or more information items regarding an interaction to a performance management service like work.com.

Figure 4:
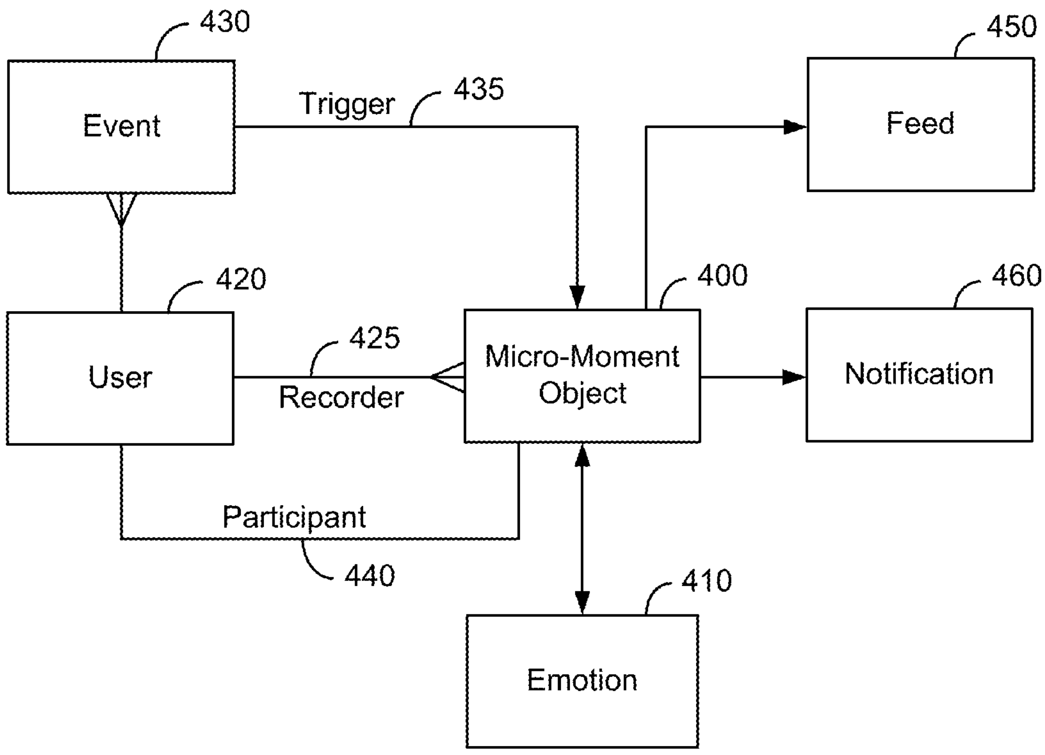
FIG. 4 shows a shows an example of a system diagram of components for capturing information regarding a real-world moment to a database in an on-demand database service according to some implementations.

FIG. 4 shows a shows an example of a system diagram of components for capturing information regarding a real-world moment to a database of an on-demand database service according to some implementations. As a user interacts with their environment and experiences real-world moments, the user may decide whether to capture information corresponding to the real-world moments using a client device. The client device may be configured to record information to a micro-moment object 400. The micro-moment object 400 may be a custom object, where the custom object may be a database table with one or more data categories logically arranged as data fields or columns in a viewable schema. Each of the data fields or columns may have values to describe aspects of the micro-moment object 400.

For example, one such data field may be an emotion 410 that is associated with the micro-moment object 400. The emotion 410 can express a subjective attitude, sentiment, feeling, thought, disposition, expression, or mood about the micro-moment 400. The emotion 410 may be provided by a user input. In some implementations, the emotion 410 can be selected from a limited and predefined set of options. In some implementations, the emotion 410 may also describe behavior and other aspects of the micro-moment object 400.

Recordation of information to a micro-moment object 400 may begin at an event 430. The event 430 refers to an event on the client device, such as a calendar event, that satisfies a trigger 435. The trigger 435 may cause the client device to provide data to generate a user interface, where the user interface may be configured to receive information for the micro-moment object 400. This may occur if the user decides to record information for the micro-moment object 400. Otherwise, the user may decide not to record information and the micro-moment object 400 is not created. The trigger 435 may be set by the user so that when certain conditions are met by the event 430, the recordation of information to the micro-moment object 400 may begin.

After the event 430, the user 420 may record information to the micro-moment object 400. The user 420 may use a recorder 425 to record information, such as a Moments App. The information can include values to the data field for the emotion 410. Other information can include names of participants 440. In some implementations, additional information can include values to data fields for a time, a date, a location, the user 420, and a type of event 430. In some instances, the client device may be context aware and capable of ascertaining information regarding the names of participants 440, the time, the date, the location, the user 420, and/or the type of event 430. This can reduce the amount of friction a user may otherwise experience in recording information for the micro-moment object 400. The recorded information can be provided to generate the micro-moment object 400.

After the micro-moment 400 is generated, one or more of the participants 440 may be notified of the micro-moment object 400. In some implementations, a network or media communication may be sent to the one or more of the participants 440 to provide a notification 460. The notification 460 can include a visual representation of or a link to the micro-moment object 400. In some implementations, the micro-moment object 400 may be rendered as a feed item in a feed of an online social network.

FIGS. 5A-5H show a series of user interfaces illustrating a process flow for capturing information regarding a real-world moment according to some implementations. FIGS. 5A-5H may illustrate a process flow for capturing a user's interactions with people to provide a rich profile of the people that the user interacts with. Such information may be useful in a context such as a business context.

Figure 5A:
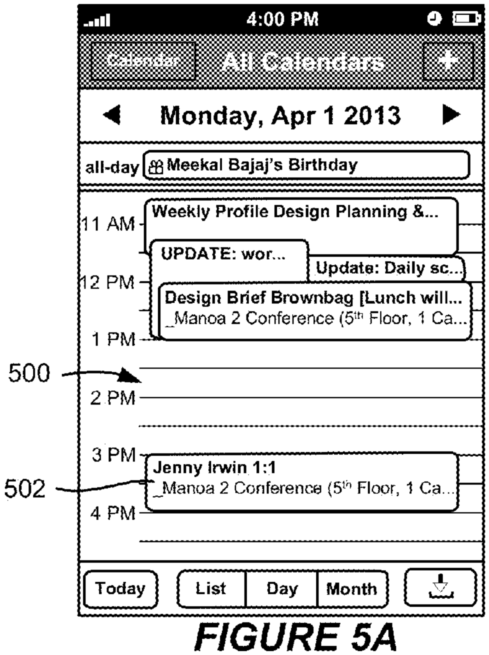
FIGS. 5A-5H show a series of user interfaces illustrating a process flow for capturing information regarding a real-world moment according to some implementations.

In FIG. 5A, a user interface 500 of a client device, such as a smartphone, may display a calendar application showing a plurality of scheduled events/reminders for a user. One of the scheduled events can include a meeting 502 with Jenny Yoon between 3:00 pm and 4:00 pm on Apr. 1, 2013.

Figure 5B:
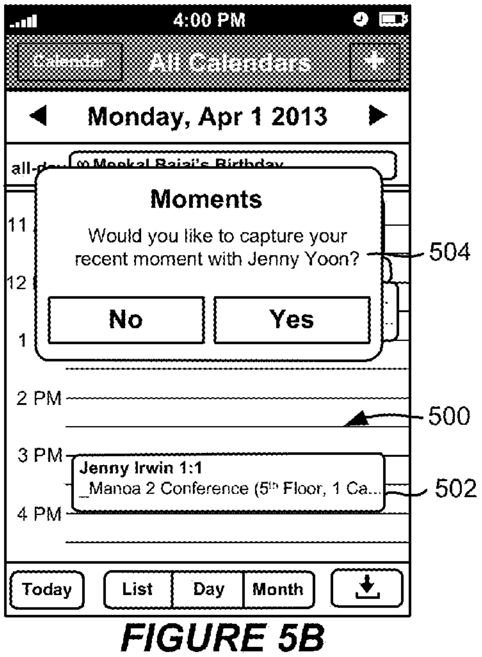

In FIG. 5B, the user interface 500 may display a notification or pop-up window 504 asking the user if he would like to capture his recent moment with Jenny Yoon. The notification 504 may appear at the conclusion of the meeting 502. The notification 504 may permit the user to capture the recent moment with Jenny Yoon using a Moments App. The calendar application may be synchronized with the client device and the user may have set the Moments App to trigger the notification 504 at the conclusion of scheduled events such as the meeting 502.

Figure 5C:
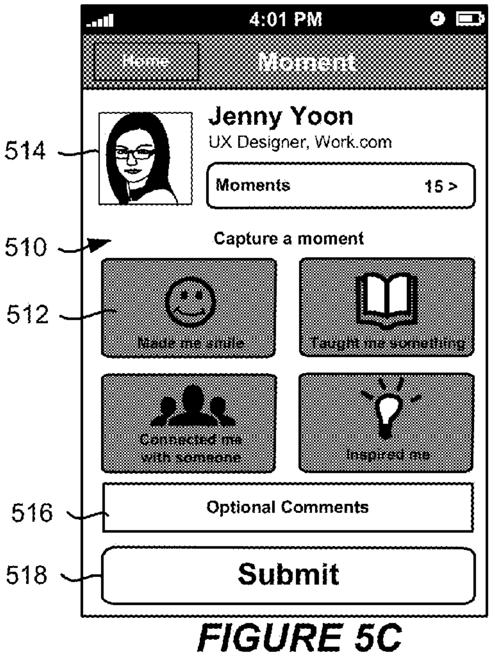

If the user selects "Yes" in the notification 504, a user interface 510 in FIG. 5C may display predefined options 512 for recording information about the recent moment with Jenny Yoon. The predefined options 512 may be selected by the user to express an emotion about the recent moment with Jenny Yoon. The user may select a predefined option 512 to indicate that Jenny Yoon "made me smile," "taught me something," "connected me with someone," or "inspired me." The user interface 510 may also display contact information 514 for Jenny Yoon. The contact information 514 may be preloaded from the client device, since the names of the participants in the moment can be previously identified in the calendar application. Thus, the Moments App can identify Jenny Yoon in a contacts database and provide the contact information 514 for Jenny Yoon in the user interface 510. The contacts database can be stored locally on the client device or accessed externally from the client device. The contact information 514 for Jenny Yoon may include a name, a job title, a company, a profile picture, and a number of moments the user has had with Jenny Yoon.

Figure 5D:
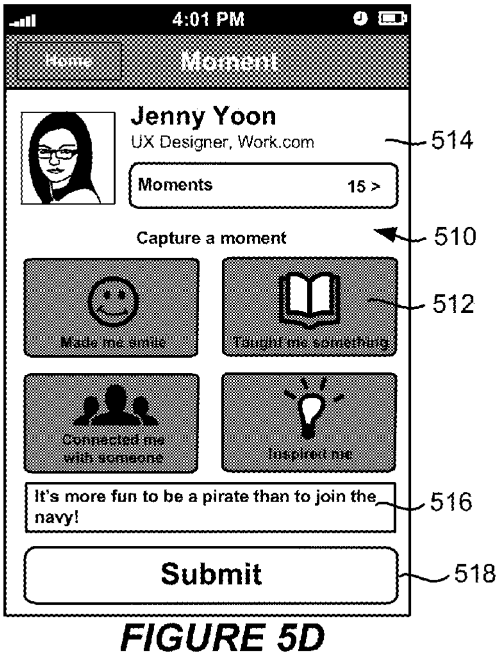
Figure 5E:
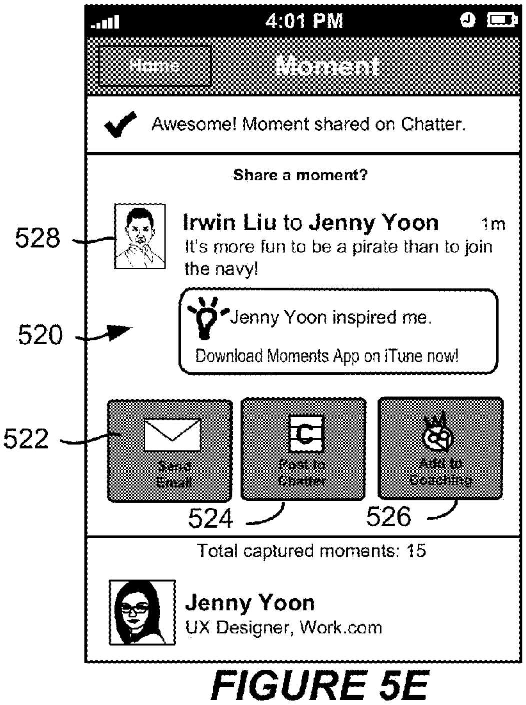

In addition to selecting one of the predefined options 512, the user may enter comments 516 to accompany the user-selected option 512. In FIG. 5D, the user may select one of the predefined options 512 and enter a comment 516 of "It's more fun to be a pirate than to join the navy!" into a text box. The user may select the Submit button 518 to share the recorded information regarding the recent moment with Jenny Yoon.

After the user captures information regarding the moment, a user can choose to perform one or several options in sharing that information. A user interface 520 in FIG. 5E can display options of a Send Email button 522, a Post to Chatter button 524, and an Add to Coaching button 526. If the user selects the Send Email button 522, an email is sent with the recorded information to Jenny Yoon or other email recipient. If the user selects the Post to Chatter button 524, a feed item including the recorded information is published in a feed on Chatter®. If the user selects the Add to Coaching button 526, the recorded information can be sent to a performance management service like work.com or other work system, where the recorded information can be used in a performance metric. The user interface 520 may also include a visual feedback element 528 that includes the recorded information regarding the recent moment with Jenny Yoon. The visual feedback element 528 may render the recorded information as a feed item or notification, where the visual feedback element 528 can include the recorded comment "It's more fun to be a pirate than to join the navy!", the recorded moment "Jenny Yoon inspired me," the identity of the user (Irwin Liu) who recorded the moment, and the identity of the recipient (Jenny Yoon) to which the moment is directed. The user interface 520 may also include a notification with the visual feedback element 528 that the user is using the Moments App as well as a link for the recipient to download the Moments App. If Jenny Yoon decides to respond, this can drive further engagement with Irwin Liu and Jenny Yoon based on the moment. Moreover, this can drive adoption of the Moments App itself as Jenny Yoon may choose to record moments of her own.

Figure 5F:
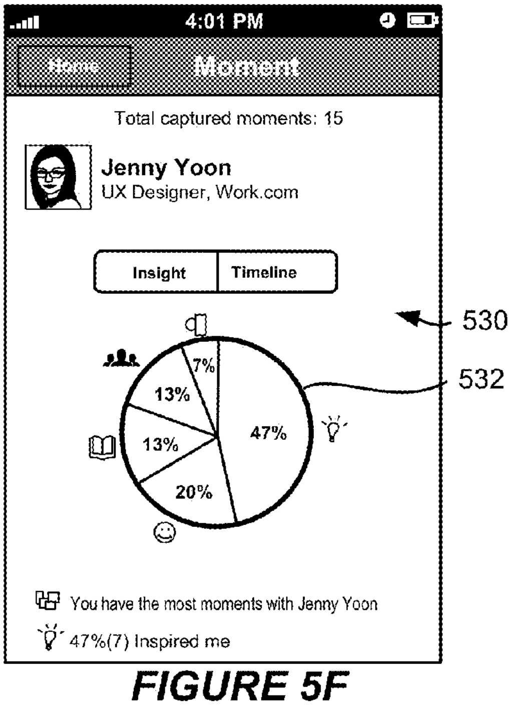

In FIG. 5F, after the recorded information is shared, a user interface 530 may be displayed showing a profile 532 of Jenny Yoon that summarizes the user's moments shared with Jenny Yoon. The profile 532 may be displayed as a pie chart showing the kinds of interactions that the user has with Jenny Yoon. The profile 532 aggregates the recent moment with previous moments shared with Jenny Yoon, and the aggregation shows that Jenny Yoon inspired the user in 47% of his interactions with her, that Jenny Yoon made the user smile in 20% of his interactions with her, that Jenny Yoon taught the user something in 13% of his interactions with her, and that Jenny Yoon connected the user to someone in 13% of his interactions with her. The pie chart can be part of data-driven insights about the user's interactions with Jenny Yoon. The profile 532 can also include data-driven insights about the user's interactions with Jenny Yoon, including the fact that the user has the most moments with Jenny Yoon, and that Jenny Yoon inspires the user in 47% (7 moments) of the user's interactions with her.

This kind of information as exemplified by the profile 532 may be useful to the user, to others, and to the organization, especially in a business context. As more information is recorded to capture moments with people across a network of users, the information can be leveraged to provide trends, patterns, and other useful data. Data-driven insights and statistics about employees can be ascertained that can assist other employees and the organization.

Figure 5G:
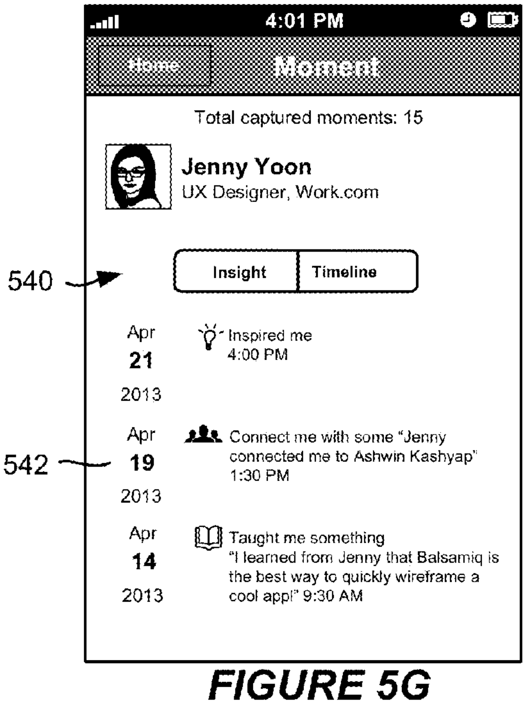

In FIG. 5G, a user interface 540 can display the aggregation of the user's moments with Jenny Yoon in the form of a timeline 542. The timeline 542 can show the user's interactions with Jenny Yoon in a week-by-week format, day-by-day format, hour-by-hour format, and so forth. Thus, the timeline 542 can show the user's interactions with Jenny Yoon over a sequence of time. Data presented in the form of a profile 532 or a timeline 542 may be provided not only to the user, but may also be shared with others.

Figure 5H:
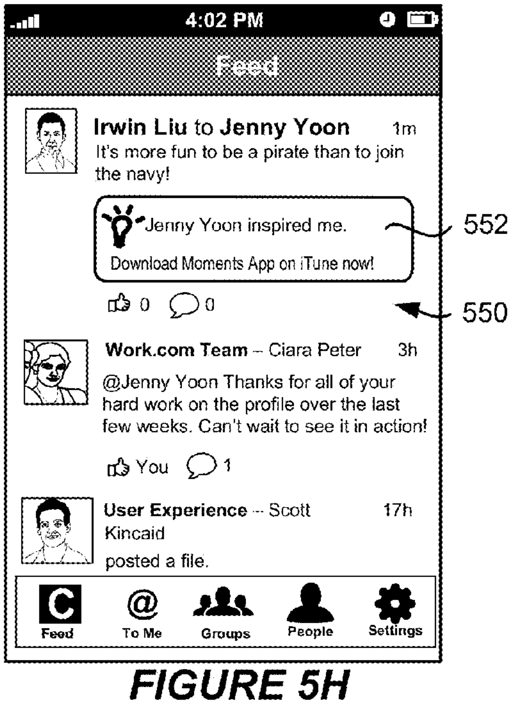

FIG. 5H shows a user interface 550 where the recorded information regarding the user's moment with Jenny Yoon is provided in a feed item 552 of a feed. For example, the feed item 552 may be published to a feed of an online social network. Any online social network may have an application programming interface (API) for rendering such a feed item 552 coming from the Moments App. Here, a Chatter® feed shows the feed item 552 shared with users who have access to the Chatter® feed. The users may be notified that Jenny Yoon inspired Irwin Liu and may be able to further engage in dialogue regarding the moment.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer-implemented method comprising:

processing an indication of an interaction with a client device, the processing comprising determining that the indication of the interaction satisfies a user-defined trigger, the user-defined trigger identified in association with an application event selected by a user, the application event capable of occurring on the client device;

causing, responsive to determining that the indication of the interaction satisfies the user-defined trigger, a user interface on the client device to display or update one or more input controls configured to receive information items regarding the interaction;

processing one or more information items submitted via the one or more input controls, the one or more information items being identifiable in association with the interaction, the one or more information items comprising values for a first data field regarding a user-selected expression and a second data field regarding an entity associated with the interaction;

causing the one or more information items to be identified by one or more information objects in a database; and causing one or more profile objects associated with the entity to be generated or updated based on an aggregation of the one or more information items with attributes of the entity, wherein the profile objects comprise statistics of the information items with attributes of the entity, and wherein the attributes of the entity comprise previously recorded information items from at least the user or one or more other users corresponding to the entity; and causing a visual representation of the one or more profile objects to be displayed in the user interface of the client device, wherein the visual representation incorporates the statistics of the information items.

2. The method of claim 1, further comprising:

sending a notification of the one or more information items to the entity associated with the interaction.

3. The method of claim 1, further comprising:

retrieving the attributes of the entity from the database before causing the one or more profile objects for the entity to be generated.

4. The method of claim 3, wherein the one or more information items include a first interaction data item for the entity with respect to the user, and the retrieved attributes of the entity include a second interaction data item for the entity with respect to the user.

5. The method of claim 1, wherein the user-selected expression is selected from a plurality of predefined icons, the input controls being capable of receiving a user input that selects one of the predefined icons.

6. The method of claim 1, wherein the entity includes a contact, product, or service.

7. The method of claim 6, wherein the contact, product, or service represents a data object stored in a database of the client device, an online social network, or a data repository service.

8. The method of claim 1, wherein the one or more information items include additional data fields, the additional data fields regarding one or more of a location, a time, a date, the user, and a type of interaction with the client device.

9. The method of claim 8, wherein the one or more profile objects include analytics according to one of the first, second, and additional data fields.

10. The method of claim 8, further comprising:

determining a performance metric based on the aggregation of the information items with the attributes of the entity, wherein the performance metric includes statistics of the entity according to one of the first, second, and additional data fields.

11. The method of claim 8, wherein processing the one or more information items includes:

processing information from the client device for one or both of the second data field and the additional data fields.

12. The method of claim 8, wherein processing the one or more information items includes:

processing information from a user input for one or both of the second data field and the additional data fields.

13. The method of claim 1, wherein the user-defined trigger includes at least one of: a calendar event trigger, a time-based trigger, a media communications trigger, a photo or video capture trigger, a location-based trigger, an audio-based trigger, a Bluetooth-enabled trigger, a near-field communications (NFC) trigger, and an application-based trigger.

14. A client device associated with a user, the client device comprising:

a display; and one or more processors configurable to:

process an indication of an interaction with a client device, the processing comprising determining that the indication of the interaction satisfies a user-defined trigger, the user-defined trigger identified in association with an application event selected by a user, the application event capable of occurring on the client device;

cause, responsive to determining that the indication of the interaction satisfies the user-defined trigger, a user interface on the client device to display or update one or more input controls configured to receive information items regarding the interaction;

process one or more information items submitted via the one or more input controls, the one or more information items being identifiable in association with the interaction, the one or more information items comprising values for a first data field regarding a user-selected expression and a second data field regarding an entity associated with the interaction;

cause the one or more information items to be identified by one or more information objects in a database; and cause one or more profile objects associated with the entity to be generated or updated based on an aggregation of the one or more information items with attributes of the entity, wherein the profile objects comprise statistics of the information items with attributes of the entity, and wherein the attributes of the entity comprise previously recorded information items from at least the user or one or more other users corresponding to the entity; and provide a visual representation of the one or more profile objects in the user interface of the client device, wherein the visual representation incorporates the statistics of the information items.

15. The client device of claim 14, wherein the one or more information items include additional data fields, the additional data fields regarding one or more of a location, a time, a date, the user, and a type of interaction with the client device.

16. The client device of claim 15, wherein the one or more processors are configured to execute one or more instructions to:

determine a performance metric based on the aggregation of the information items with the attributes of the entity, wherein the performance metric includes statistics of the entity according to one of the first, second, and additional data fields.

17. The client device of claim 14, wherein the user-defined trigger includes at least one of: a calendar event trigger, a time-based trigger, a media communications trigger, a photo or video capture trigger, a location-based trigger, an audio-based trigger, a Bluetooth-enabled trigger, a near-field communications (NFC) trigger, and an application-based trigger.

18. A non-transitory computer-readable storage medium storing instructions executable by a processor, the instructions configurable to cause:

processing an indication of an interaction with a client device, the processing comprising determining that the indication of the interaction satisfies a user-defined trigger, the user-defined trigger identified in association with an application event selected by a user, the application event capable of occurring on the client device;

displaying or updating, responsive to determining that the indication of the interaction satisfies the user-defined trigger, a user interface on the client device to present one or more input controls configured to receive information items regarding the interaction;

processing one or more information items submitted via the one or more input controls, the one or more information items being identifiable in association with the interaction, the one or more information items comprising values for a first data field regarding a user-selected expression and a second data field regarding an entity associated with the interaction;

identifying the one or more information items using one or more information objects in a database; and generating or updating one or more profile objects associated with the entity based on an aggregation of the one or more information items with attributes of the entity, wherein the profile objects comprise statistics of the information items with attributes of the entity, and wherein the attributes of the entity comprise previously recorded information items from at least the user or one or more other users corresponding to the entity; and providing a visual representation of the one or more profile objects in the user interface of the client device, wherein the visual representation incorporates the statistics of the information items.

19. The non-transitory computer-readable storage medium of claim 18, wherein the user-defined trigger includes at least one of: a calendar event trigger, a time-based trigger, a media communications trigger, a photo or video capture trigger, a location-based trigger, an audio-based trigger, a Bluetooth-enabled trigger, a near-field communications (NFC) trigger, and an application-based trigger.

* * * * *